Figure 1:
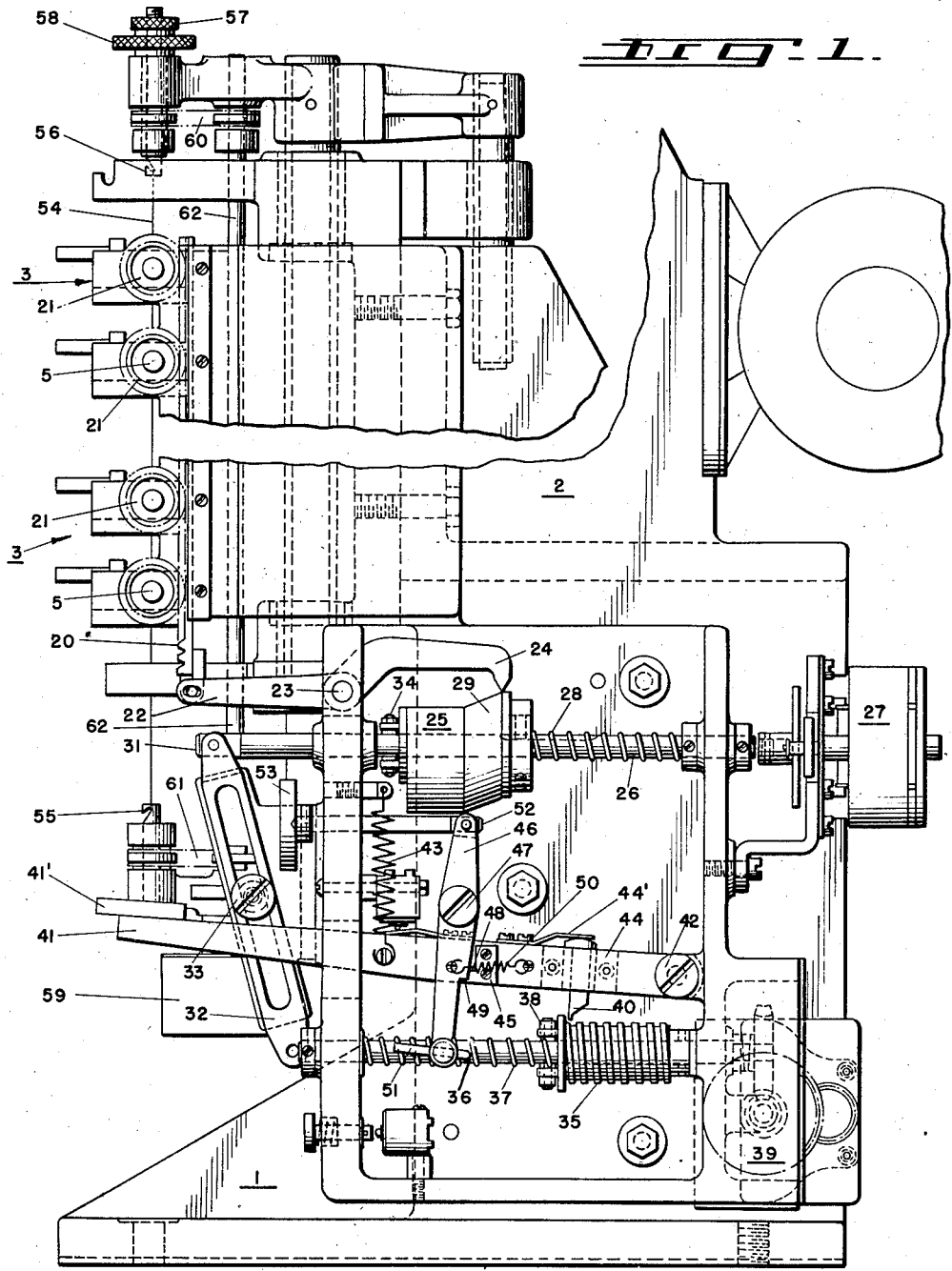
Figure 2:
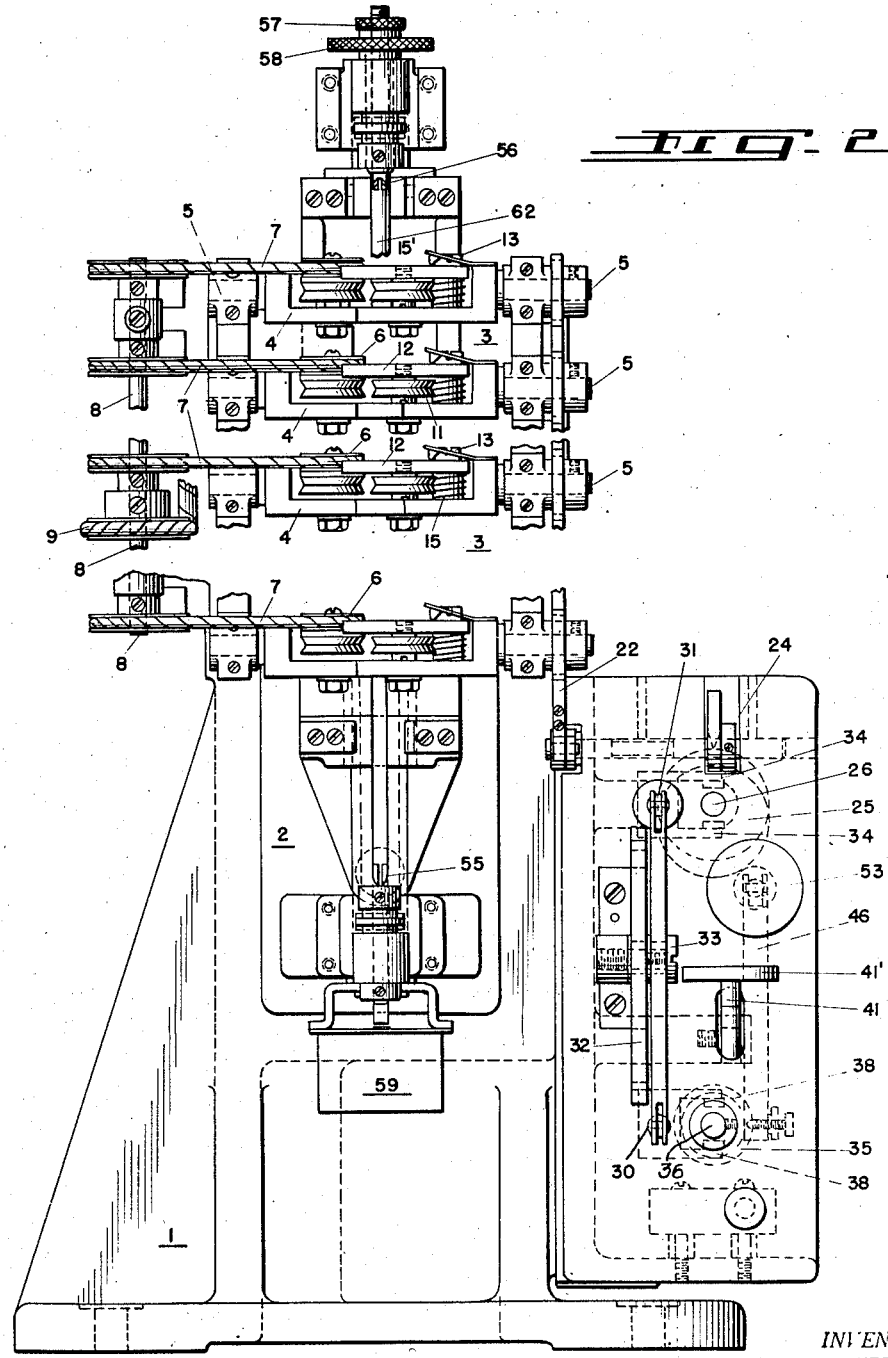
Figure 3:
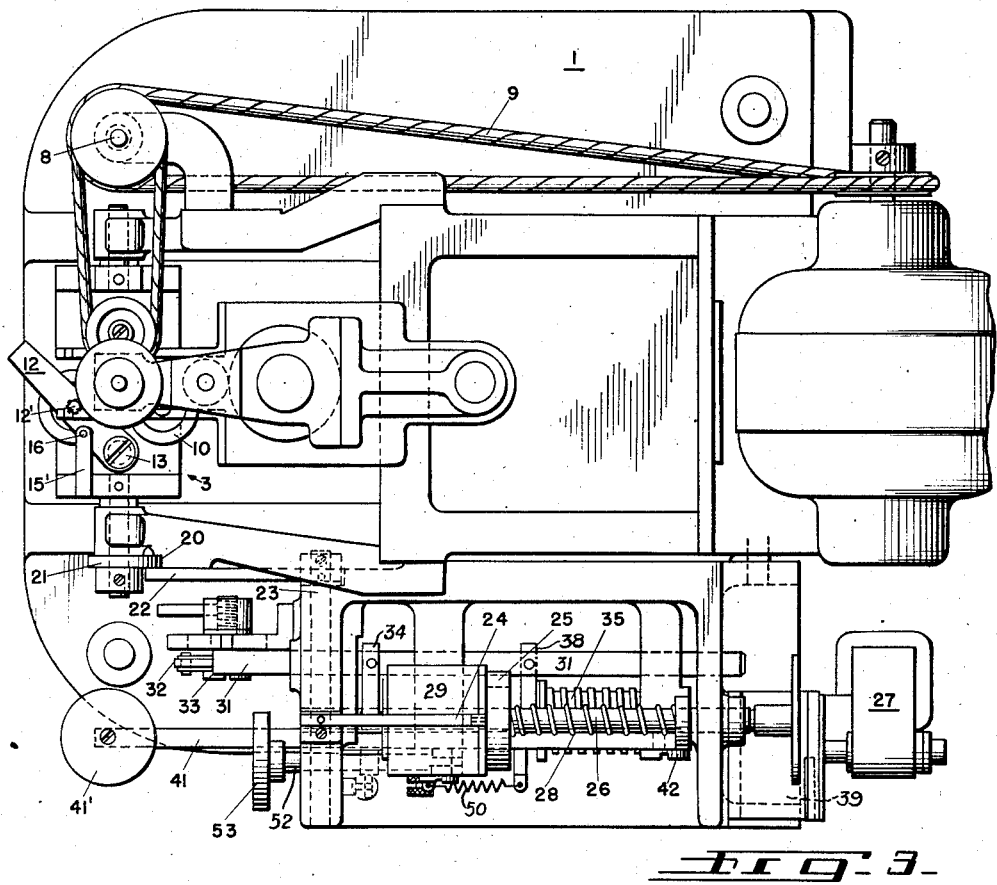

Sept. 18, 1945. R. B. MENTZER 2,385,015
SHAPING MACHINE
Filed Nov. 23, 1942 6 Sheets-Sheet 1

INVENTOR.
RALPH B. MENTZER
BY James M. Heilman
ATTORNEYS.

INVENTOR.
RALPH B. MENTZER
BY James M. Heilman
ATTORNEYS.

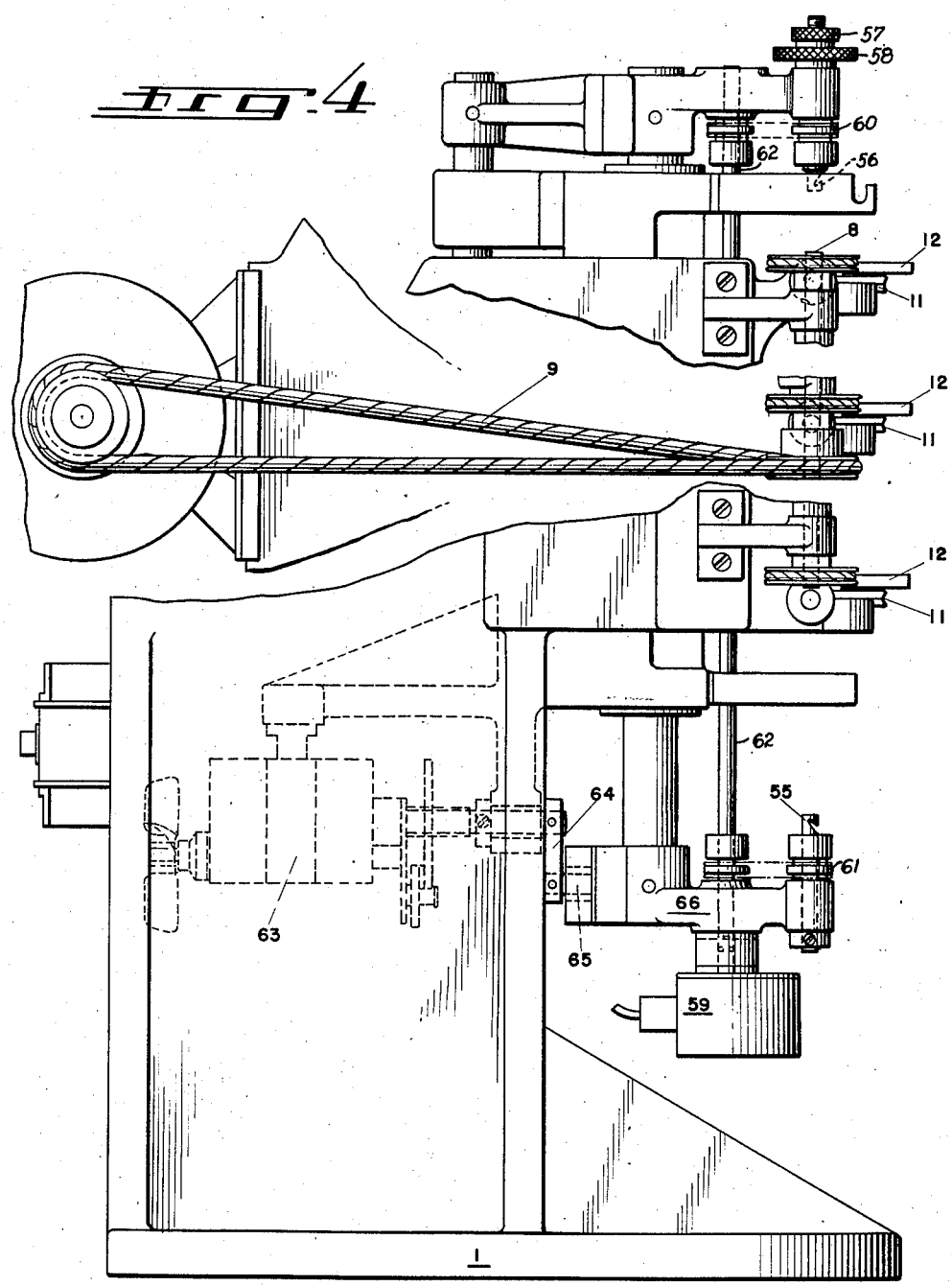

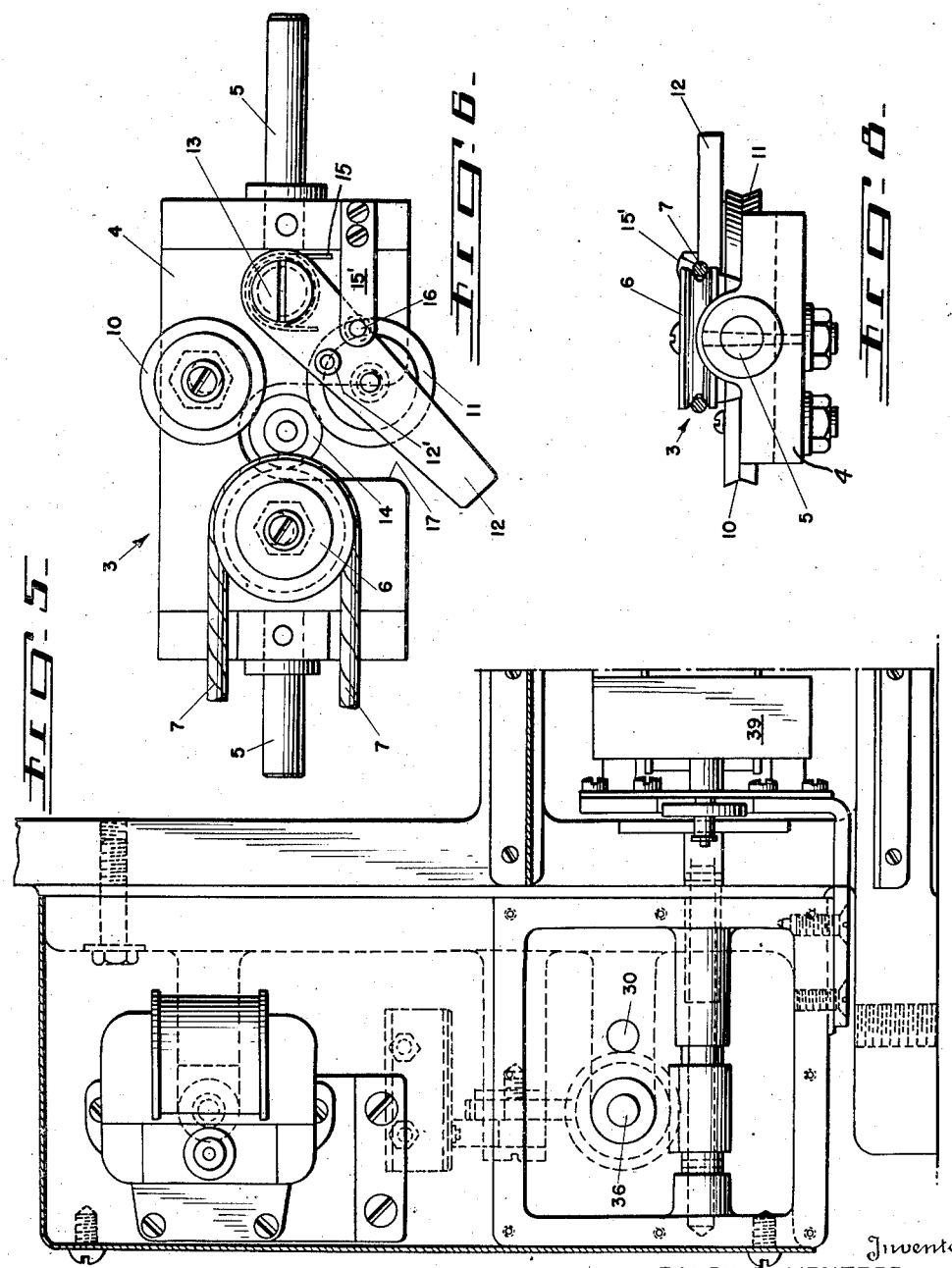

Sept. 18, 1945.    R. B. MENTZER    2,385,015
SHAPING MACHINE
Filed Nov. 23, 1942    6 Sheets-Sheet 6
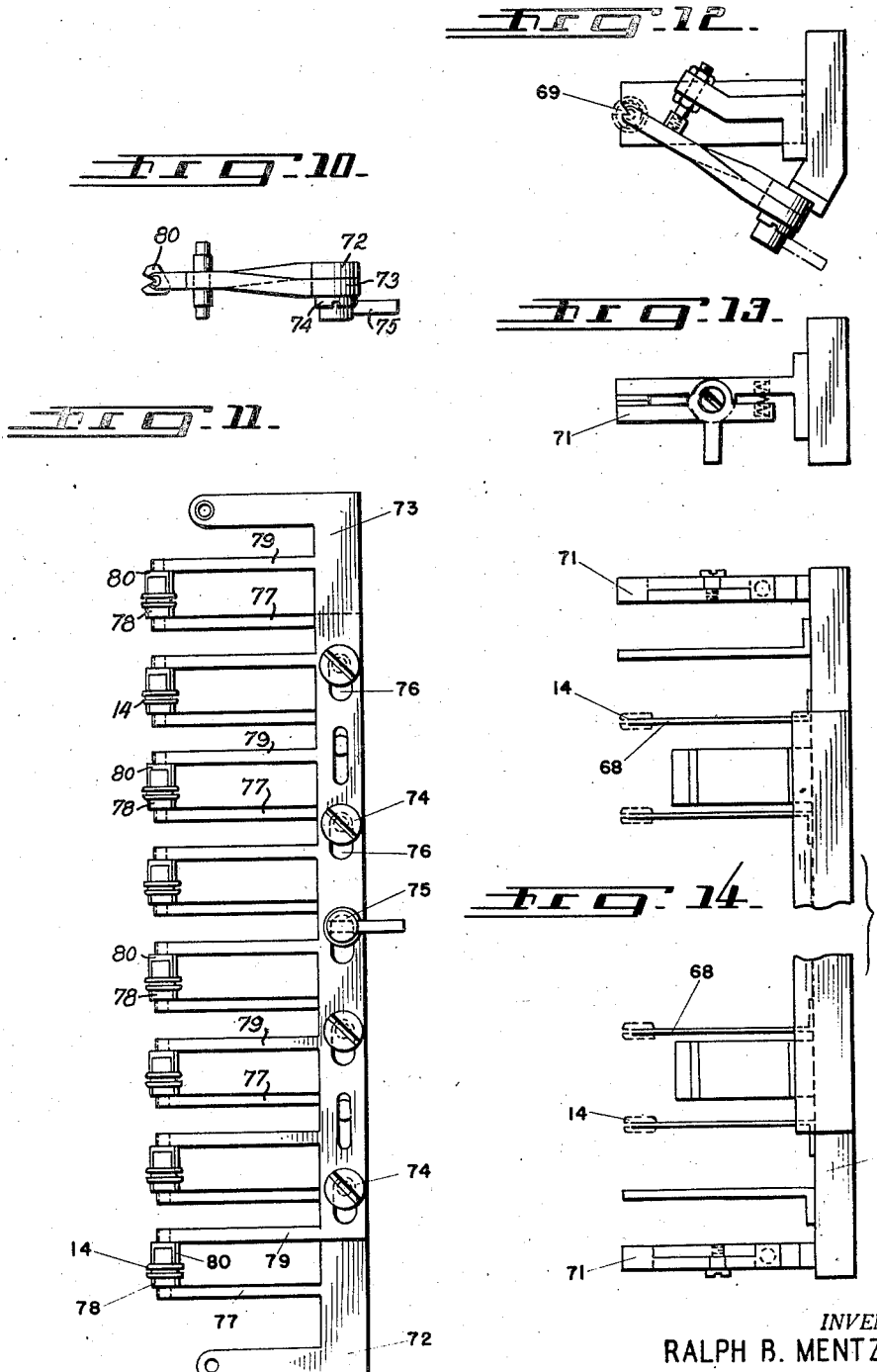
INVENTOR.
RALPH B. MENTZER
BY
ATTORNEYS.

Patented Sept. 18, 1945

2,385,015

UNITED STATES PATENT OFFICE 2,385,015

SHAPING MACHINE

Ralph Bender Mentzer, Lancaster, Pa., assignor to Hamilton Watch Company, Lancaster, Pa.

Application November 23, 1942, Serial No. 466,604

7 Claims. (Cl. 51—46)

This invention relates to surfacing devices and has particular reference to devices for surfacing the walls of holes or openings.

An object of this invention is to provide improved means and method of shaping the walls of an already formed hole or opening to predetermined contours.

Another object is to surface the walls of an opening to an "olived" contour.

Another object is to provide means for automatically so relatively moving a portion of a surfacing member through and with respect to an opening as to form the walls of the opening to an "olived" contour.

Another object is to provide means for automatically relatively moving a portion of a surfacing member through and with respect to an opening in a series of reciprocations.

Another object is to provide means for automatically relatively moving a portion of a surfacing member through and with respect to an opening so as to progressively change the angular relation therebetween through a given arc of movement.

Other and further objects will be apparent from the following specification and from the drawings.

With reference to the drawings:

Fig. I is a side elevation of a structure illustratively embodying this invention;

Fig. II is a front elevation of the structure of Fig. I;

Fig. III is a plan view of the structure;

Fig. IV is a side elevation taken oppositely from Fig. I;

Fig. V is a partial rear elevation taken oppositely from Fig. II;

Fig. VI is a plan view of a single workholder unit;

Fig. VII is a front view of the structure of Fig. VI taken partially in vertical section.

Fig. VIII is a left end elevation of the structure of Fig. VI;

Fig. IX is a right end elevation of the structure of Fig. VI;

Fig. X is a plan view of a workholder mounting device;

Fig. XI is a front elevation of the structure of the mounting device of Fig. X;

Fig. XII is a view illustrating the coaction between the mounting device of Fig. XI and a workholder loading device;

Fig. XIII is an end view of the workholder loading device of Fig. XII; and

Fig. XIV is a view of the workholder loading device of Fig. XII, taken in elevation like that of Fig. XI.

This invention is directed to an automatic machine embodying an improved method of surfacing the walls of openings or holes.

The invention provides means whereby a group of holed objects may be surfaced together with a consequent and desirable uniformity of treatment of each object.

The objects to be treated are mounted with their openings in alignment and a portion of a tool is moved through and relatively with respect to the openings in rotational, longitudinal and arcuate movements.

An illustrative embodiment of this invention is shown in the drawings. Its purpose is to "olive" drilled holes in jewels, such as timepiece or instrument jewels. An "olive" is comparable to an hour glass contour. An "olived" opening has a wall which is of curved convex contour. It is formed in bearing jewels so that the pivot will have an annular bearing which is substantially a line contact, with the line contact at the narrow or neck portion of the hour glass.

It is to be understood that other objects and applications than that of the jewels mentioned above may readily fall within the scope of this invention.

In the manufacture of such jewels, an opening is first made through the jewel, usually by drilling to a rough cylindrical contour. The walls of these openings are then surfaced to produce the desired olived contour. The device and method of this invention make it possible to carry out this oliving automatically, quickly, simply, inexpensively, and with a group of such jewels together.

In the structure illustrated in the drawings each of several jewels is set in a holder which rests in one of a series of evenly spaced supports on a loading structure and a wire is strung through the holes of all the several jewels. A mounting structure is then engaged with the loading structure and the wire on which the jewels are strung is picked up with the jewels and their holders clamped in the same spaced positional relation in which they were arranged on the loading structure.

The mounting structure is then so arranged with respect to an automatic oliving machine as to enable each jewel holder to be clamped in one of a series of jewel holder assemblies or operating units on the machine without removal from the mounting structure. When the jewel holders are all clamped in the oliving machine, the mounting structure is unclamped and removed, leaving the jewel holders in the machine ready for the oliving operation with the jewels still strung on the wire.

The wire on which the jewels are strung is secured at both its ends to the oliving machine to form a bow-like structure.

Abrasive is applied to the wire and several operational motions are simultaneously carried out until the oliving operation is completed.

The motions are as follows: The jewel holders are held against longitudinal movement with respect to the abrasive wire on which they are strung, and the wire itself is reciprocated longitudinally of itself. The abrasive wire is rotated about its own longitudinal axis. The jewel holders are rotated in their individual jewel holder assemblies about the longitudinal axes of the holes in their respective jewels. The jewel holders are tilted through progressively increasing lengths of arc such that the longitudinal axes of the jewel holes swing with respect to the longitudinal axis of the abrasive wire about pivot points located centrally of the longitudinal axes of the jewel hole openings. This is the motion which produces the olive contour.

Because of these various motions, the wear characteristics of the abrasive wire are uniform, the hole walls are surfaced evenly, and the olive contour on each jewel is uniform with itself and with the similar contours of the other jewels in the machine.

A timing arrangement is used with this machine and is provided both with an automatic stop and one which is operable at will.

The tilting of the jewel holder assemblies is accomplished through a cam arrangement in connection with the timing arrangement.

Several different motors are used to power the different motions of this machine but a single motor could readily be arranged to supply all the power for all the motions if desired.

Referring to the drawings in detail:

The machine is provided with a base 1 supporting an upright section 2 with most of the operating mechanism mounted in the base portion and the jewel holders with the workpieces therein mounted in a vertically arranged series of identical jewel holder assemblies 3.

Figure 7:
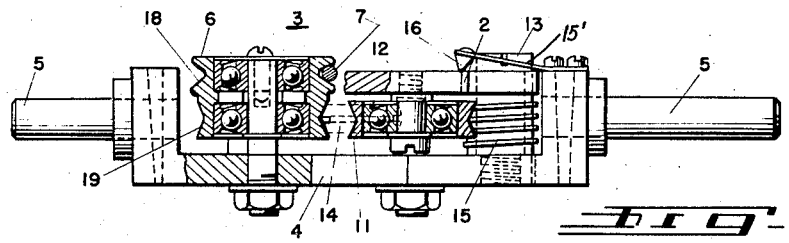
Figure 9:
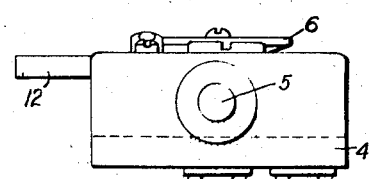

Referring to Figs. 6 through 9, each of the jewel holder assemblies 3 comprises a base 4 provided with laterally extending pivot shafts 5 which are horizontally pivotally mounted in the upright 2. A drive pulley 6 is fixedly mounted on the base 4 and is supplied with power through an individual belt 7 which derives its power from a driven shaft 8 which in turn is driven by a master belt 9. A second fixed pulley 10 is mounted on the base 4 and a third and movable pulley 11 is mounted on an arm 12 which is pivoted to the base 4 as at 13 so that pulley 11 is movable toward and away from pulleys 6 and 10 and in the operation of the machine. The workholder 14 is clamped between pulleys 6, 10 and 11 by means of a spring 15 (see Fig. VII) which tends to move the arm 12 about its pivot 13 in a clockwise direction, that is in the direction of the workholder 14. When the arm 12 is moved counterclockwise about the pivot 13 an opening 12' on the upper surface of the arm 12 is so positioned that a spring nose 16 mounted on a flat spring 15' will drop into the opening 12' and hold the arm 12 in such open position against the action of spring 15 as to permit the insertion or removal of the holder 14. When the holder 14 is clamped between the three rolls the driven pulley 6 may transmit its motion to the idler pulleys 10 and 11 through the workholder 14. In other words the pulley 6 rotates the workholder 14 and the holder 14 in turn rotates the idler pulleys 10 and 11. A horizontally extending slot 17 is provided in the base 4 through which the workholder 14 may be inserted or removed when the arm 12 is so swung about its pivot 13 as to leave the slot 17 open.

Accordingly one movement, that of rotation, of the workholder is accomplished through the driving action of the pulley 6 so that the workholder and the jewel therein are rotated about a longitudinal axis of the jewel opening or jewel hole.

Pulley 6 is provided with a groove 18 adapted to receive the driving belt 7 and an annular surface 19 adapted to bear against the workholder 14. Each of the idler pulleys 10 and 11 are so positioned vertically as to be in horizontal alignment with the surface 19 and each have similar surfaces on which the contact with the jewel holder is made. It is to be understood that these contact surfaces may be of any desired contour to suit the contour of a particular jewel holder and that those shown are merely so shown by way of illustration.

Each of the workholder assemblies 3 is mounted for arcuate reciprocation on the pivots 5 with respect to the upright 2. It should be noted here that the longitudinal axes of the pivots 5 lie along a single axis and the workholder 14 is so mounted in the assembly 3 that the longitudinal axis of the pivot 5 passes substantially at right angles to, and through the midpoint of, the longitudinal axis of the cylindrical opening in the jewel. Therefore, a reciprocation of the assembly 3 about the pivot 5 may be accomplished while maintaining the said midpoint of the jewel effectively in a single position.

All of the jewel holder assemblies 3 are arcuately reciprocated as described above, in the same manner and together, through the action of a common rack 20 which is longitudinally and vertically reciprocated and which has a gear connection with each of the holder assemblies 3 through gears 21 mounted on the outer end of one of the pivot shafts 5 of the tool holder 3.

The reciprocation of rack 20 is such that its initial movements are relatively short and as the operation of the machine progresses they become increasingly longer so that the workholder assemblies 3 are pivoted on their shafts 5 at first through small arcs and thereafter through arcs of increasingly greater length.

This reciprocation is accomplished through the action of a cam lever 22 centrally pivoted at 23 to the base 1, having one end secured to the lower end of the rack 20 and the other end in the form of a cam finger 24 resiliently held against and adapted to follow the contours of a cam 25.

The cam 25 is mounted on a shaft 26 for rotation therewith and adapted to be moved longitudinally thereof. The shaft 16 is rotated by motor 27 and the cam 25 in the starting position of the devices is located as shown in Fig. I, held adjacent one end of the shaft 26 by a coil spring 28 mounted on the shaft 26.

It will be seen that the cam is so formed that if merely rotated and left at one position along the shaft 26 there would either be no reciprocation of the rack 20 or the length of the reciprocatory movements would not change.

Accordingly an arrangement is provided which gradually moves the cam 25, while it is rotating, along the shaft 26 against the action of spring 28. As this occurs the cam finger 24 moves down the slope of cam surface 29 and the cam is so formed as to provide more and more distance difference between high and low point of the cam with respect to the shaft 26 as the finger 24 progresses down the surface 29. Thus increasingly longer movements are imparted to the gear shaft 20 as the cam 25 progresses along the shaft 26.

This longitudinal movement of the cam is provided through the action of a combination of the timing shaft 36, shaft 30 and pusher shaft 31 as linked together by a link member 32 pivoted to slotted section of the base 1 at 33. The shaft 30 is adapted to progress longitudinally on its own axis in the direction of the link 32 and this progress causes the link 32 to move about its pivot 33 in such a manner as to cause the shaft 31 to move in the direction of the cam 25. The shaft 31 is provided with pusher lugs 34 which are adapted to engage with one end of the cam 25 in such a manner as to push it along the shaft 26 against the action of spring 28. The link 32 is made in two parts, an upper part secured to the shaft 31 at one end and the timing shaft 30 at the other. A movable pivot 33 is adjustable in cooperating slots in both the upper and bottom parts of the link 32. The bottom part of said link is stationary and engages the lower nut of the pivot 33.

The link 32 is so made as to be ratially adjustable by unlocking and moving the pivot screw 33 on its slotted base and this adjustment makes it possible to exaggerate or minimize the longitudinal motion of the shaft 30 in its effect upon the shaft 31 so that greater or less movement may be imparted to the cam 25 for the same longitudinal movement of the shaft 30 by shifting the pivot 33 on the slided section of the base to change the ratio of the movement of the shafts connected to the respective ends of the link 32.

The means for so moving the shaft 30 longitudinally as to move the cam 25 along the shaft 26 includes an exteriorly threaded sleeve 35. The sleeve 35 is mounted on a shaft 36 for rotation therewith and longitudinal movement with respect thereto against the action of spring 37. Lugs 38 are mounted on the shaft 30 for engagement with the one end of the sleeve 35 whereby movement of the sleeve 35 along shaft 36 against the action of spring 37 will so position the lugs 38 as to cause the shaft 30 to move longitudinally in the direction of the link 32 as previously described. Shaft 36 and consequently sleeve 35 are rotated by motor 39 and movement of the sleeve 35 along the shaft 36 is occasioned by the engagement of a thread finger 40 with the thread of the sleeve 35 in combination with the rotary motion of that sleeve.

The finger 40 is brought into engagement with th thread of the sleeve 35 through the action of a starting lever 41 which is pivoted to the base 1 at 42. This starting lever is normally held out of operation by a spring 43 which has one secured to a portion of the base 1. In order to start the sleeve 35 in its movement along the shaft 36 starting lever 41 is depressed by means of finger button 41'. The finger 40 is mounted in a bracket 44 on the starting lever 41 and is pressed downwardly by a spring member 44' as a safety measure. That is, when the starting lever is depressed, if the finger 40 should not immediately drop into the thread of the sleeve 35, a resilient action is provided by the spring 44' which prevents damage to either the sleeve 35 or the finger 40.

In order to hold the starting lever 41, in operating position with the finger 40 in engagement with the thread of the sleeve 35, a bracket 45 is mounted on the lever 41 and a lever 46 is pivotally mounted at 47 on the base 1. The bracket 45 has an upwardly facing shoulder 48 and the arm 46 has a downwardly facing shoulder 49 which are adapted to engage each other in such locking relation as to hold the lever 41 down in operative position. The lever 46 is provided with such a tendency to counterclockwise movement about its pivot 47 by a spring 50 as to bring the shoulders 48 and 49 into locking engagement as soon as the lever 41 has been depressed. When the machine is to be stopped, clockwise movement of the lever 46 about its pivot 47 will disengage the shoulders 48 and 49 and permit the spring 43 to lift the starting lever 41 out of operation, thus disengaging the finger 40 from the thread of the sleeve 35 and stopping the movement of the sleeve 35 along the shaft 36 and consequently the motion of the cam 29 along the shaft 26 against the action of the spring 28. As further consequences, the cam 25 and the sleeve 35 will be immediately returned to their starting positions as shown in Fig. I by the actions of the springs 28 and 37.

There are two arrangements for so moving the lever 46 as to disengage the shoulders 48 and 49 and stop the machine. One embodies an automatic stop feature and is in the form of a pin 51 mounted on the lower end of the lever 46 and adapted to be engaged by a portion of the sleeve 35 and thereafter moved in consequence of a further movement of the sleeve 35 sufficient to disengage the shoulders 48 and 49. It will be seen that the pin 51 may be adjusted to a greater or less length in the direction of the sleeve 35 so that the time period of the operation of the machine may be varied at will by an initial adjustment of the pin 51. This time factor which is in effect the length of time it takes the finger 40 to follow the pitch of the thread of the sleeve 35 for a given number of revolutions may also be expressed in terms of the length of the arc in which the workholder assembly reciprocates.

The other means for moving the lever 46 about its pivot 47 in a clockwise direction to stop the machine is a shaft 52 provided with a finger button 53 and pivoted to the upper end of the lever 46. This shaft is operable at will so that the machine may be stopped at any time by pressing the finger button 53.

A wire 54 is strung through the opening in each of the jewels in each of the workholder assemblies 3. This wire may be abrasive in itself, or merely capable of carrying abrasive. Wire 54 is secured at its lower end to a fixed hook 55 and at its upper end to an adjustable hook 56. The adjustment of the hook 56 is longitudinal through a screw member 57 provided with a lock nut 58 in order to tighten the wire. A motor 59 is adapted to rotate the wire 54 about its own longitudinal axis. The wire 54 is driven at both its upper and lower ends through belt connections 60 and 61 between the shafts of the hooks 55 and 56 and the drive shaft 62 of the motor 59.

The drive shaft 62 has an upper bearing in the support for the hook 56 and a lower bearing in the support for the hook 55 so that with the wire, a bow like arrangement is provided which moves bodily in vertically straight line reciprocatory movement. The motor 59 is included in this movement which is powered by a motor 63 which drives a Scotch yoke comprising a link 64 mounted on the drive shaft of the motor 63 and supporting a pin 65 which reciprocates in a horizontally extending slot in the support 66 on which the hook 55 is mounted.

In order to expedite the mounting of jewel holders in the jewel holder assemblies 3, a loading member as illustrated in Fig. XIV and a mounting member as illustrated in Fig. XI are provided. The loading member 67 is provided with a series of uprights 68 spaced at regular intervals and in alignment with each other. These uprights have upper cut-out portions 69 adapted to receive jewel holders 14. When a jewel holder containing a jewel has been mounted in each of the uprights 68, a wire such as wire 54, is strung through the openings in the jewels and clamped in the end portions 71 of the loading member 67.

The mounting member of Fig. XI is then assembled with the loading member 67 as shown in Fig. XII so that the jewel holders 14 may be transferred to the mounting member. This mounting member comprises two plates 72 and 73, one of which supports guide screws 74 having locking nuts 75 and mounted in elongated slots 76 in the other. A series of identical spaced uprights 77 are formed on the plate 72 with workholder engagement portions 78 extending in one direction and a series of uprights 79 formed on the plate 73 with workholder engaging portions 80 extending in the opposite direction to portion 78. Thus slided movement of the plates 72 and 73 with respect to each other will open apertures between workholder clamping portions 78 and 80 on each of a pair of uprights 77 and 79, one on each of the plates 72 and 73 so that the workholder may be positioned in the opening thus provided and the plates 72 and 73 thereafter so slidably moved with respect to each other as to clamp the workholders between the portions 78 and 80 while maintaining the same spaced relation of the workholders 14. The workholders mounted in the mounting member of Fig. XI may be brought into alignment with the workholder assemblies 3 of the machine of Fig. I. Each of the arms 12, see Fig. VI, are moved to open position, and the mounting member of Fig. XI is so moved as to push each workholder within the triangle formed by the three rollers 6, 10 and 11. The wire 54 on which the workholders are still strung is then transferred from the mounting member of Fig. XI to the hooks 55 and 56 of Fig. I and tightened as desired and each of the arms 12, see Fig. VI, are so moved as to clamp each workholder in position in its respective workholder and the mounting of Fig. XI is then removed and the operation of the machine proceeded with.

What I claim is:

1. An automatic surfacing machine including a workholder adapted to hold a workpiece having an opening therethrough, a tool so mounted as to extend through the opening of a workpiece in said workholder and so formed as to be capable of surfacing action on the walls of said workpiece opening, and means for providing relative rotational movement and automatically controlled adjustable oscillatory movement in between said tool and a workpiece in said workholder said oscillatory movement progressively increasing.

2. An automatic surfacing machine including a workholder adapted to hold a workpiece having an opening therethrough, a tool so mounted as to extend through the opening of a workpiece in said workholder and so formed as to be capable of surfacing action on the walls of said workpiece opening, means for providing relative rotational movement and arcuately reciprocatory movement in progressively increasing length of arc between said tool and a workpiece in said workholder, and automatic stop means operable when said arcuate movement accomplishes a predetermined degree of arc.

3. An automatic surfacing machine including a workholder adapted to hold a workpiece having an opening therethrough, a tool so mounted as to extend through the opening of a workpiece in said workholder and so formed as to be capable of surfacing action on the walls of said workpiece opening, and means for providing relative rotational movement and arcuately reciprocatory movement in progressively increasing lengths of arc between said tool and a workpiece in said workholder, said means for producing said arcuately reciprocatory movement including cooperatively functioning cam and timing arrangements.

4. An automatic surfacing machine including a workholder adapted to hold a workpiece having an opening therethrough, a tool so mounted as to extend through the opening of a workpiece in said workholder and so formed as to be capable of surfacing action on the walls of said workpiece opening, means for providing relative rotational movement and arcuately reciprocatory movement in progressively increasing length of arc between said tool and a workpiece in said workholder, automatic stop means operable when said arcuate movement accomplishes a predetermined degree of arc, and adjustment means for varying said predetermined degree of arc at which said stop means is operable.

5. An automatic surfacing machine including a workholder adapted to hold a workpieec having an opening therethrough, a tool so mounted as to extend through the opening of a workpiece in said holder and so formed as to be capable of surfacing action on the walls of said workpiece opening, means for rotating said workpiece, means for imparting automatically adjustable controlled oscillatory movement to said workpiece, means for rotating said tool and means for imparting longitudinally reciprocatory movement to said tool.

6. An automatic surfacing machine including a workholder adapted to hold a workpiece having an opening therethrough, a tool so mounted as to extend through the opening of a workpiece in said workholder and so formed as to be capable of surfacing action on the walls of said workpiece opening, means for rotating said workpiece, means for imparting automatically controlled oscillatory movement, and means for adjusting said control means, means for rotating said tool and means for imparting longitudinally reciprocatory movement to said tool.

7. In an automatic surfacing machine, a workholder assembly including a fixedly mounted driven roller, a fixedly mounted idler roller and an adjustably mounted idler roller, said rollers being adapted to engage and clamp a workholder therebetween in such a manner that the driven roller imparts movement to the idler rollers through the workholder, said workholder being adapted to hold a workpiece having an opening therethrough, a tool so mounted as to extend through the opening of a workpiece in said workholder and so formed as to be capable of surfacing action on the walls of said workpiece opening and means for providing relative rotational and arcuately reciprocatory movement between said tool and a workpieec in said workholder.

RALPH BENDER MENTZER.